(12) United States Patent
Kimura et al.

(10) Patent No.: US 10,794,104 B2
(45) Date of Patent: Oct. 6, 2020

(54) CONTROL DEVICE FOR OPENING AND CLOSING BODIES

(71) Applicant: Mitsuba Corporation, Gunma (JP)

(72) Inventors: Takashi Kimura, Kiryu (JP); Ryosuke Kishino, Kiryu (JP); Masahiro Fueki, Kiryu (JP); Takayuki Ikeda, Kiryu (JP)

(73) Assignee: Mitsuba Corporation, Gunma (JP)

( * ) Notice: Subject to any disclaimer, the term of this patent is extended or adjusted under 35 U.S.C. 154(b) by 103 days.

(21) Appl. No.: 16/086,858

(22) PCT Filed: Mar. 17, 2017

(86) PCT No.: PCT/JP2017/010879
§ 371 (c)(1),
(2) Date: Sep. 20, 2018

(87) PCT Pub. No.: WO2017/164106
PCT Pub. Date: Sep. 28, 2017

(65) Prior Publication Data
US 2019/0093408 A1    Mar. 28, 2019

(30) Foreign Application Priority Data

Mar. 23, 2016  (JP) ................................. 2016-058625

(51) Int. Cl.
*B62D 25/00* (2006.01)
*E05F 15/40* (2015.01)
(Continued)

(52) U.S. Cl.
CPC ............ *E05F 15/40* (2015.01); *E05F 15/622* (2015.01); *E05F 15/70* (2015.01); *B60J 5/101* (2013.01);
(Continued)

(58) Field of Classification Search
CPC ......... E05F 15/40; E05F 15/70; E05F 15/622; E05Y 2400/502; E05Y 2400/452;
(Continued)

(56) References Cited

U.S. PATENT DOCUMENTS

| | | | |
|---|---|---|---|
| 7,370,905 B2 * | 5/2008 | Watanabe | E05F 15/63 296/146.1 |
| 7,423,400 B2 * | 9/2008 | Chinsen | E05F 15/611 318/280 |

(Continued)

FOREIGN PATENT DOCUMENTS

| | | |
|---|---|---|
| CN | 101824958 A | 9/2010 |
| CN | 102216550 A | 10/2011 |

(Continued)

OTHER PUBLICATIONS

Chinese Patent Office, Office Action issued in CN 201780018115.5 dated Jun. 21, 2019, 8 pages.

(Continued)

*Primary Examiner* — Jerry E Redman
(74) *Attorney, Agent, or Firm* — Wood Herron & Evans LLP (57) ABSTRACT

Provided is a control device for an opening and closing member configured to drive a driving source of an opening and closing member that opens and closes an opening section of a vehicle, and the control device for an opening and closing member includes a power generation detector configured to detect power generation of the driving source, and a controller configured to control driving of the driving source, wherein the controller is changed to a sleep state upon stoppage of the opening and closing member, and is activated from the sleep state to control a braking of the driving source when the power generation detector detects power generation of the driving source.

2 Claims, 9 Drawing Sheets

(51) Int. Cl.
*E05F 15/622* (2015.01)
*E05F 15/70* (2015.01)
*B60J 5/10* (2006.01)

(52) U.S. Cl.
CPC ..... *E05Y 2400/44* (2013.01); *E05Y 2400/452* (2013.01); *E05Y 2400/502* (2013.01); *E05Y 2400/514* (2013.01); *E05Y 2800/404* (2013.01); *E05Y 2900/546* (2013.01)

(58) Field of Classification Search
CPC ........... E05Y 2400/514; E05Y 2400/44; E05Y 2800/404; E05Y 2900/546; B60J 5/101
USPC .......................................................... 296/56
See application file for complete search history.

(56) References Cited

U.S. PATENT DOCUMENTS

| | | | | |
|---|---|---|---|---|
| 9,845,631 | B2* | 12/2017 | Eggeling | E05F 15/611 |
| 10,415,276 | B2* | 9/2019 | Bussis | E05B 85/16 |
| 2004/0070355 | A1* | 4/2004 | Ogura | E05B 81/60 |
| | | | | 318/280 |
| 2004/0107640 | A1 | 6/2004 | Ishihara et al. | |
| 2004/0212334 | A1* | 10/2004 | Kawanobe | E05F 15/40 |
| | | | | 318/280 |
| 2006/0181108 | A1* | 8/2006 | Cleland | E05F 15/43 |
| | | | | 296/146.4 |
| 2007/0114956 | A1* | 5/2007 | Hashimoto | H02P 29/032 |
| | | | | 318/139 |
| 2008/0276537 | A1* | 11/2008 | Hanna | E05F 15/622 |
| | | | | 49/343 |
| 2009/0302637 | A1* | 12/2009 | Iijima | E05F 15/77 |
| | | | | 296/155 |
| 2017/0268280 | A1* | 9/2017 | Kim | B60J 5/10 |
| 2018/0238098 | A1* | 8/2018 | Rhode | E05F 15/73 |
| 2019/0093408 | A1* | 3/2019 | Kimura | E05F 15/40 |
| 2019/0128040 | A1* | 5/2019 | Mitchell | E05F 15/40 |
| 2019/0145150 | A1* | 5/2019 | Kidena | G06N 20/00 |
| | | | | 701/49 |

FOREIGN PATENT DOCUMENTS

| | | |
|---|---|---|
| CN | 104736363 A | 6/2015 |
| JP | 07259412 A | 10/1995 |
| JP | 2001107642 A | 4/2001 |
| JP | 2008002074 A | 1/2008 |
| JP | 2009057038 A | 3/2009 |
| JP | 2009531572 A | 9/2009 |

OTHER PUBLICATIONS

PCT Office, International Search Report issued in PCT/JP2017/010879 dated May 9, 2017, 3 pages.

* cited by examiner

CONTROL DEVICE FOR OPENING AND CLOSING BODIES

TECHNICAL FIELD

The present invention relates to a control device for an opening and closing member.

Priority is claimed on Japanese Patent Application No. 2016-058625, filed Mar. 23, 2016, the content of which is incorporated herein by reference.

BACKGROUND ART

In the related art, a control device for an opening and closing member that drives a tailgate using an actuator is installed in a vehicle. The actuator is provided between a surrounding of an opening on the vehicle body side and a tailgate provided at the opening portion which is made to be openable and closable, and is driven to extend and contract in an axial direction by the driving of a motor provided in the device itself, whereby the tailgate can be opened and closed. Accordingly, the control device for an opening and closing member controls opening and closing of the tailgate by rotating an electric motor. Also, in order to maintain an open state of the tailgate, a damper including a gas piston filled with a high pressure gas, or a cylindrical coil spring is attached to the vehicle.

In addition, in order to prevent the tailgate from suddenly dropping down due to failure of the damper or the actuator, a sensor for detecting dropping down of the tailgate is incorporated into the actuator. Accordingly, the control device for an opening and closing member can prevent the tailgate from suddenly falling by stopping rotation of an electric motor on the basis of a signal output from the sensor when sudden falling of the tailgate is detected.

CITATION LIST

Patent Literature

[Patent Literature 1]
Japanese Unexamined Patent Application Publication (Translation of PCT Application) No. 2009-531572

SUMMARY OF INVENTION

Technical Problem

However, in the control device for an opening and closing member described above, in order to prevent the tailgate from dropping down suddenly, it is necessary to constantly monitor for dropping down of the tailgate by causing the sensor built into the actuator to be in an activated state whenever the tailgate is open. Therefore, electrical power of a battery mounted in the vehicle is wastefully consumed. Such a problem is not a problem limited to this tailgate and is a problem shared by opening and closing members provided in vehicles.

An aspect of the present invention is directed to providing a control device for an opening and closing member capable of preventing falling of an opening and closing member installed at the vehicle while saving electric power.

Solution to Problem

An aspect of the present invention is a control device for an opening and closing member that drives a driving source of an opening and closing member which opens and closes an opening section of a vehicle, the control device for an opening and closing member including: a power generation detector that detects power generation of the driving source; and a controller that controls driving of the driving source, wherein the controller is changed to a sleep state upon stoppage of the opening and closing member, and is activated from the sleep state to control a braking of the driving source when the power generation detector detects power generation of the driving source.

In addition, according to the aspect of the present invention, the control device for an opening and closing member further includes a position detector that detects a position of the opening and closing member, wherein, when in the sleep state, the controller changes to a determination state by activating the position detector at prescribed interval, and controls the braking of the driving source when it is determined that the opening and closing member in moving on the basis of the position of the opening and closing member in the determination state.

In addition, according to the aspect of the present invention, when a position of the opening and closing member reaches a vicinity of a position in which the opening and closing member is in a fully closed state, the controller supplies electric power to a half-open door detection switch that detects a half-open door state of the opening and closing member with respect to the opening section.

Advantageous Effects of Invention

As described above, according to the present invention, it is possible to provide a control device for an opening and closing member capable of preventing falling of an opening and closing member installed on a vehicle while saving electric power.

DESCRIPTION OF EMBODIMENTS

Hereinafter, aspects of the present invention will be described through embodiments of the present invention, but the following embodiments do not limit the invention according to the claims. In addition, not all combinations of the features described in the embodiments are necessarily essential to the solution means of the invention. In the drawings, the same or similar parts are denoted by the same reference numerals, and duplicated description thereof may be omitted.

The control device for an opening and closing member according to the embodiment opens and closes an opening section of a vehicle by driving a driving source of an opening and closing member installed at the vehicle. The control device for an opening and closing member is in a sleep state upon stoppage of the opening and closing member and is activated from the sleep state to control braking of the driving source when power generation of the driving source is detected.

Hereinafter, the control device for an opening and closing member of the embodiment will be described with reference to the accompanying drawings. Further, while the case in which the opening and closing member installed at the vehicle is a tailgate of the vehicle has been described in the first embodiment, there is no limitation thereto and, for example, the opening and closing member may be a sliding door.

First Embodiment

Figure 1:
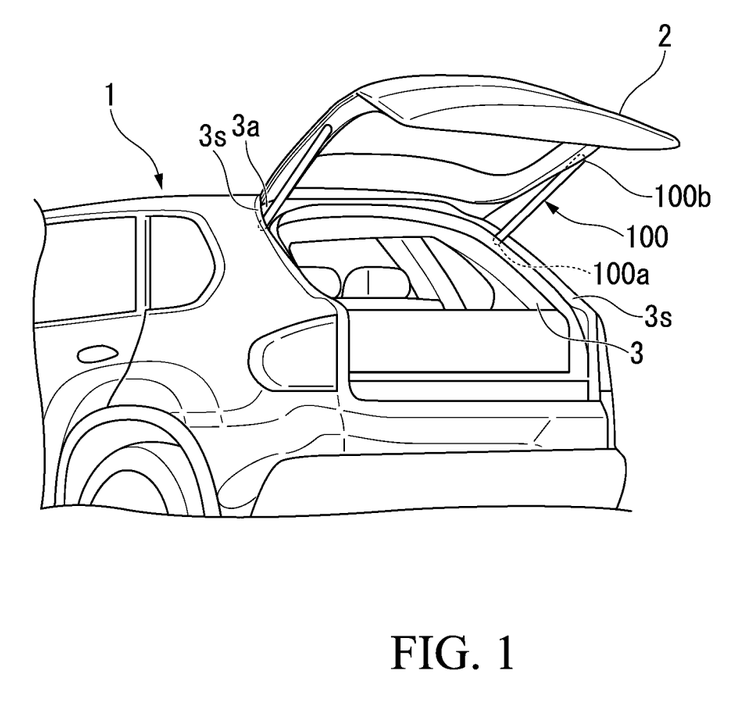
FIG. 1 is a perspective view showing an example of a vehicle 1 on which a control device 75 for an opening and closing member according to first embodiment is mounted.

FIG. 1 is a perspective view showing an example of a vehicle 1 on which a control device 75 for an opening and closing member according to a first embodiment is mounted.

As shown in FIG. 1, actuators 100 are provided in the vehicle 1, and the actuators 100 open and close, for example, a tailgate 2 of the vehicle 1 by being driven by the control device 75 for an opening and closing member according to the first embodiment. The tailgate 2 is installed on an upper section 3a of the opening section 3 so as to be openable and closable via a hinge mechanism (not shown) with respect to the opening section 3 formed on a rear section of the vehicle body of the vehicle 1.

The actuators 100 are installed at both of left and right sides of the opening section 3, and each of the actuators 100 has one end 100a that is pivotably connected to a side frame section 3s of the opening section 3 via a pin (not shown) and the other end 100b that is pivotably connected to the tailgate 2 via a pin (not shown).

Figure 2:
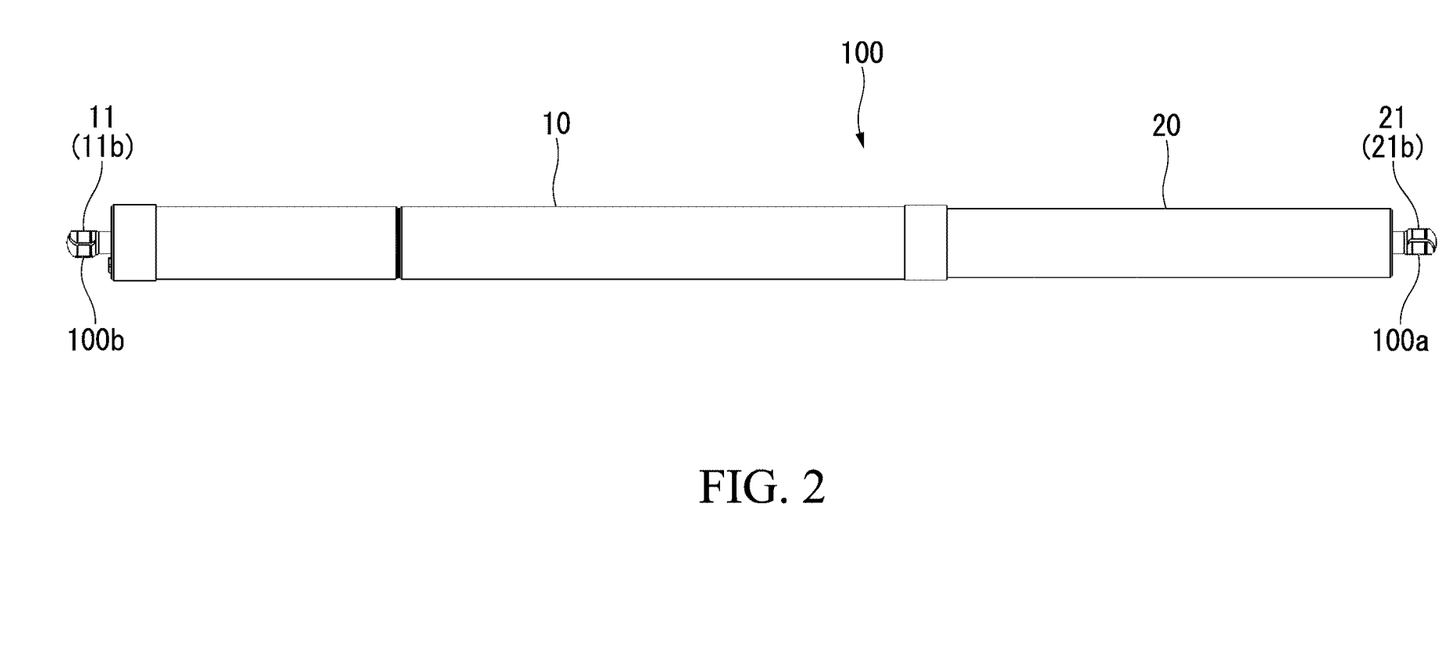
FIG. 2 is a side view showing an appearance of an actuator 100 according to the first embodiment.
Figure 3:
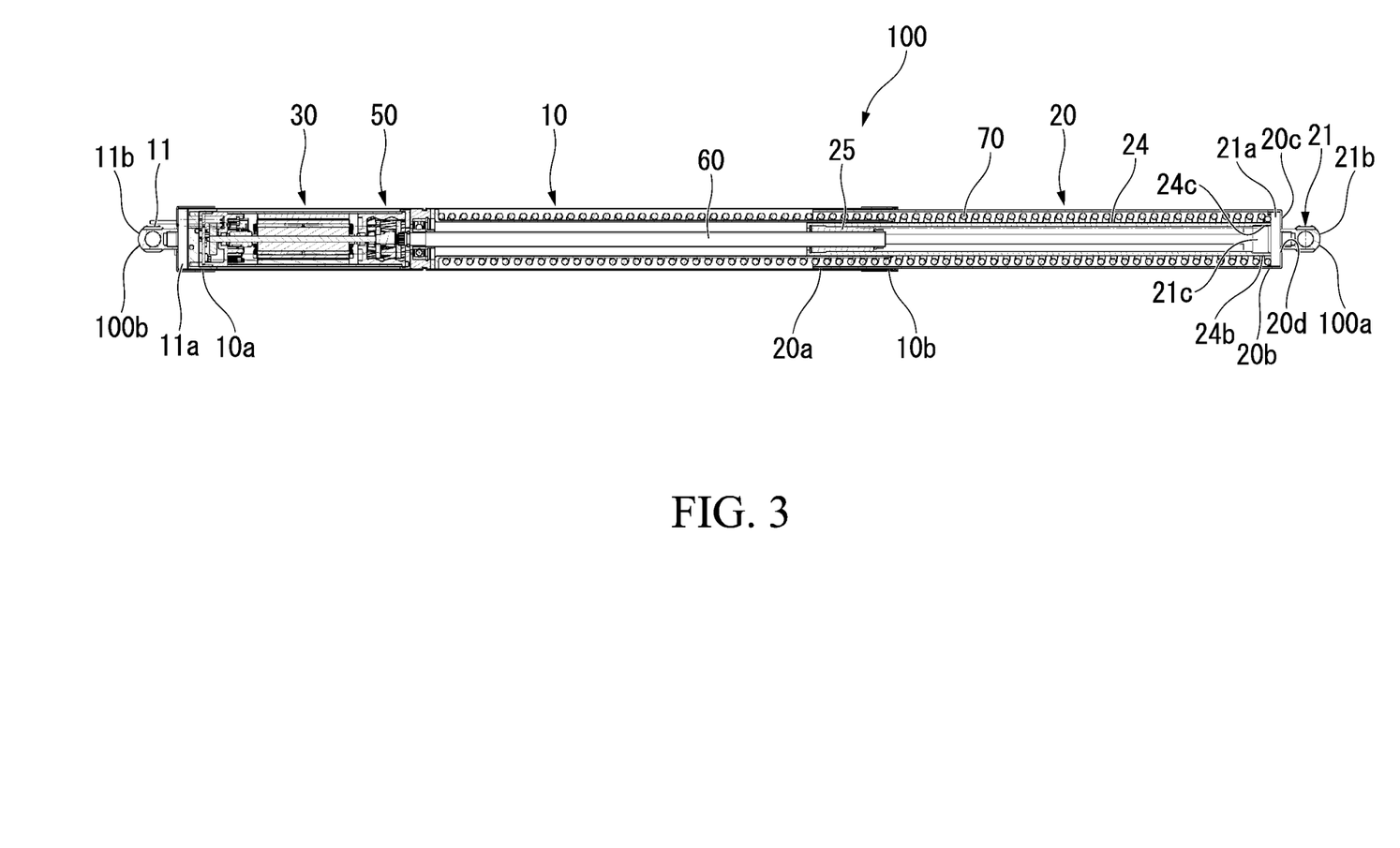
FIG. 3 is a cross-sectional view of the actuator 100 according to the first embodiment.
Figure 4:
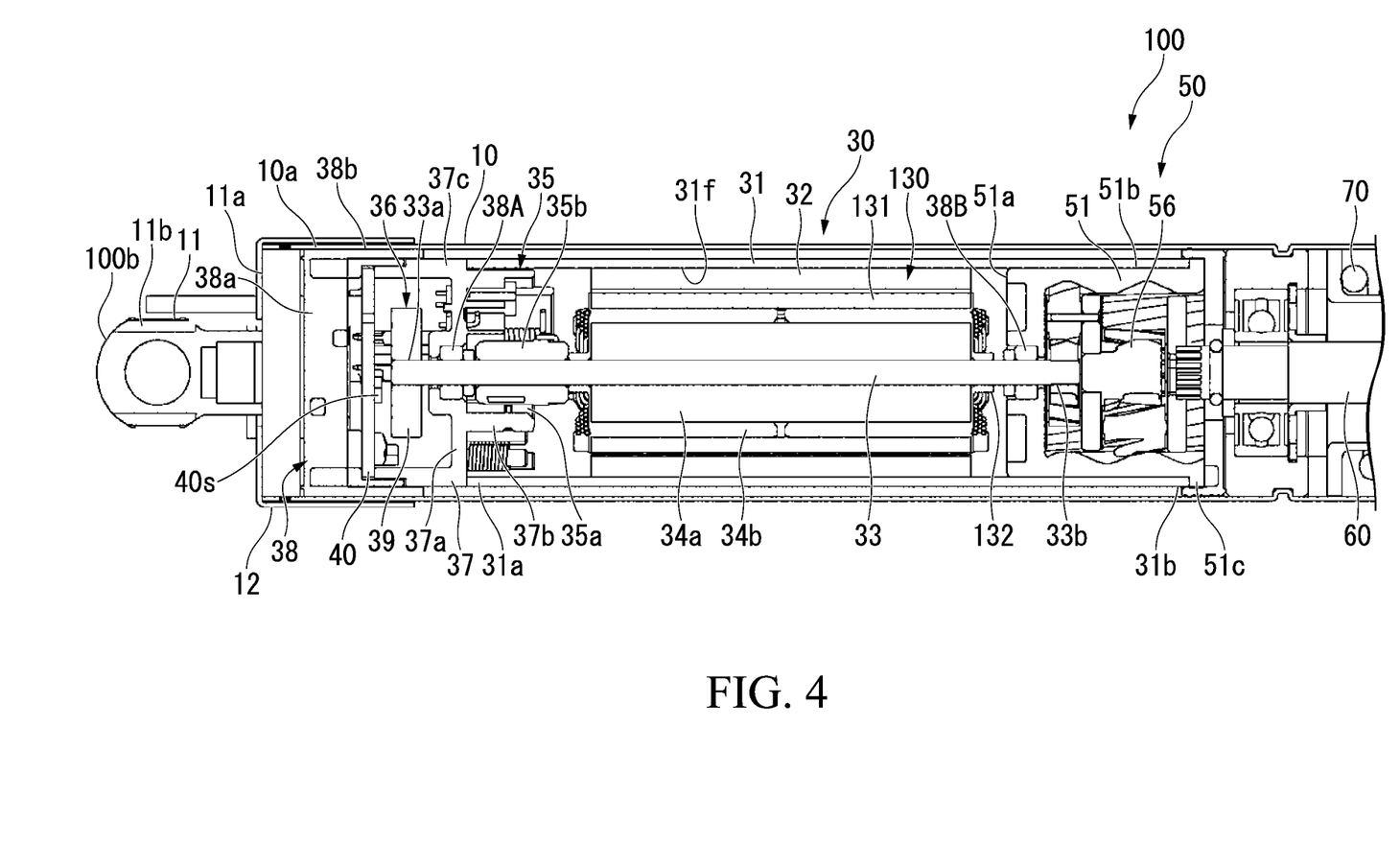
FIG. 4 is an enlarged cross-sectional view showing a motor unit 30 and a reduction gear unit 50 of the actuator 100 according to the first embodiment.

FIG. 2 is a side view showing an appearance of the actuator 100 according to the first embodiment. FIG. 3 is a cross-sectional view of the actuator 100 according to the first embodiment. FIG. 4 is an enlarged cross-sectional view showing a motor unit 30 and a reduction gear unit 50 of the actuator 100 according to the first embodiment.

As shown in FIGS. 2 and 3, the actuator 100 includes a first housing 10, a second housing 20, the motor unit 30 (a driving unit), the reduction gear unit 50 configured to reduce and output a rotating force of the motor unit 30, a screw shaft 60 rotated by a rotating force of the motor unit 30 transmitted via the reduction gear unit 50, and a coil spring 70.

The first housing 10 is formed of a metal material such as iron or the like in a cylindrical shape.

As shown in FIG. 4, a joint member 11 connected to the tailgate 2 side via a pin (not shown) is installed on one end 10a (a left side end in FIG. 4) of the first housing 10. The joint member 11 includes a plate section 11a formed in a cylindrical shape and fitted inside one end 10 of the first housing 10, and a joint section 11b protruding from the plate section 11a toward an outer side of the first housing 10 and to which a pin (not shown) is connected.

As shown in FIG. 3, the second housing 20 is formed of a material softer than the first housing 10 which is formed of a resin or the like in a cylindrical shape having an outer diameter smaller than an inner diameter of the first housing 10. In this way, reduction in weight of the second housing 20 in comparison with the first housing 10 is achieved.

The second housing 20 has one end 20a side (a left end side in FIG. 3) that is inserted into the first housing 10 from the other end 10b side (a right end side in FIG. 3) of the first housing 10. The second housing 20 is relatively movable in a direction in which the second housing 20 telescopically expands and contracts from the other end 10b with respect to the first housing 10.

The other end 20b of the second housing 20 has a bottom section 20c formed through deep drawing or the like. A through-hole 20d into which a joint section 21b of a joint member 21, which will be described below, can be inserted is formed in a center of the bottom section 20c in a radial direction.

The joint member 21 is configured to connect the side frame section 3s of the opening section 3 of the vehicle 1 and the second housing 20. The joint member 21 includes a plate section 21a fitted inside the other end 20b of the second housing 20, and the joint section 21b protruding outward from the plate section 21a via the through-hole 20d formed in the bottom section 20c. The side frame section 3s of the opening section 3 is connected to the joint section 21b via a pin (not shown).

The plate section 21a is disposed to face the bottom section 20c, and fixed to the other end 20b of the second housing 20 through caulking or the like. In addition, a male screw section 21c protruding toward an inside of the second housing 20 is formed on a center of the plate section 21a in the radial direction. The other end 24b of a cylindrical inner tube 24 is threadedly engaged with the male screw section 21c.

The cylindrical inner tube 24 is disposed in the second housing 20. The inner tube 24 is formed of, for example, aluminum through drawing. A female screw section 24c threadedly engaged with the male screw section 21c of the joint member 21 is formed in the other end 24b of the inner tube 24.

The motor unit 30 includes a yoke 31, a magnet 32 fixed to an inner circumferential surface 31f of the yoke 31, an armature 130 rotatably installed inside the yoke 31 in a radial direction, a feeding unit 35 configured to supply current to the armature 130, and a detector 36 configured to detect a rotation position of the armature 130.

The yoke 31 is formed of, for example, a metal in a cylindrical shape. The yoke 31 is disposed in the first housing 10. An outer diameter of the yoke 31 is smaller than an inner diameter of the first housing 10 by a predetermined dimension. A holder member 37 is installed at one end 31a side of the yoke 31. The holder member 37 has a plate section 37a having a disk shape and configured to cover the one end 31a of the yoke 31, a first cylindrical section 37b inserted inside the yoke 31 from the plate section 37a, and a second cylindrical section 37c formed to extend from the plate section 37a toward a side opposite to the first cylindrical section 37b.

The plate section 37a and the second cylindrical section 37c have substantially the same outer diameter as that of the yoke 31. The holder member 37 is mounted by inserting the first cylindrical section 37b into the yoke 31 and by causing the plate section 37a to abut the one end 31a (a left side end in FIG. 4) of the yoke 31.

As shown in FIG. 4, an internal gear (a gear case, a ring gear) 51 that constitutes the reduction gear unit 50 is inserted into the yoke 31 on the other end 31b side (a right end side in FIG. 4).

The internal gear 51 integrally includes a plate section 51a having a disk shape, a cylindrical section 51b having a cylindrical shape and extending from an outer circumferential section of the plate section 51a toward the other end 31b of the yoke 31, and a flange section 51c that has a diameter expanded to the outer circumferential side from the cylindrical section 51b at an end portion of the internal gear which is opposite to the plate section 51a.

As shown in FIG. 4, an end damper 38 is installed between the second cylindrical section 37c of the holder member 37 and the plate section 11a of the joint member 11. The end damper 38 is formed of a rubber-based material having elasticity and integrally includes a disc-shaped plate section 38a that is inserted between the second cylindrical section 37c of the holder member 37 and the plate section 11a of the joint member 11, and a cylindrical section 38b that extends from an outer circumferential section of the plate section 38a toward the holder member 37 and into which the second cylindrical section 37c is inserted.

The plurality of magnets 32 fixed to the inner circumferential surface 31f of the yoke 31 are elongated in a central axis direction of the yoke 31 and are installed in a circumferential direction of the inner circumferential surface 31f of the yoke 31 with intervals.

The armature 130 installed inside the yoke 31 in the radial direction has a shaft 33, a core 34a fixed to the shaft 33, and a coil 34b wound on the core 34a.

The shaft 33 is installed to extend along the yoke 31 in the central axis direction. The shaft 33 has one end 33a that is pivotably supported by an annular bearing 38A, which is installed on a central section of the plate section 37a of the holder member 37, while being pivotable about a central axis of the bearing 38A.

The other end 33b of the shaft 33 is rotatably supported by an annular bearing 38B, which is installed on a central section of the plate section Ma of the internal gear 51, while being rotatable about a central axis of the bearing 38B.

The core 34a is integrally installed on an outer circumferential surface of the shaft 33 at between the two bearings 38A and 38B. The core 34a has a plurality of teeth 131 extending radially. The coil 34b is wound on the teeth 131 via insulators 132 having an insulating property, respectively.

The feeding unit 35 is connected to the control device 75 for an opening and closing member, and supplies current supplied from the control device 75 for an opening and closing member to the armature 130. The feeding unit 35 is held by the holder member 37. The feeding unit 35 includes a brush 35a held by the holder member 37, and a commutator 35b in sliding contact with the brush 35a installed on the shaft 33. A wiring (not shown) through which electric power is supplied from the control device 75 for an opening and closing member is connected to the brush 35a. The wiring passes through the plate section 37a of the holder member 37, the end damper 38, and the plate section 11a of and the joint member 11 and is extracted from the other end 10b (a left side end in FIG. 4) of the actuator 100 to the outside. The commutator 35b is electrically connected to the coil 34b.

The detector 36 detects a rotation position of the armature 130. The detector 36 includes a sensor magnet 39 and a sensor board 40.

The sensor magnet 39 is integrally installed at the one end 33a (a left side end in FIG. 4) of the shaft 33 on the side of the second cylindrical section 37c of the holder member 37 with respect to the plate section 37a.

The sensor board 40 has a plate shape, and is held in the second cylindrical section 37c of the holder member 37.

A rotation sensor 40s configured to detect rotation of the sensor magnet 39 is installed on the sensor board 40 on the side opposite to the sensor magnet 39 when the sensor magnet 39 is rotated together with the shaft 33. For example, the rotation sensor 40s is a magnetic rotary encoder including a Hall IC. The rotation sensor 40s is connected to the control device 75 for an opening and closing member, and detects a rotation position of the armature 130 by supplying a predetermined power from the control device 75 for an opening and closing member. For example, the rotation sensor 40s may detect variation in a magnetic flux density received from the sensor magnet 39. The rotation sensor 40s generates a detection signal having different two phases (A phase and B phase) using the detected variation in magnetic flux density as an electrical signal. Then, the rotation sensor 40s converts an output value into digital signals (pulse signals) of two values as High and Low according to whether a value of an alternating signal of each phase exceeds a predetermined value (i.e., whether an intensity of a magnetic field received by the rotation sensor 40s exceeds a predetermined intensity). The rotation sensor 40s outputs the A phase pulse signal and the B phase pulse signal as the pulse signal of each phase to the control device 75 for an opening and closing member as a detection signal.

As described above, when electric power is applied to the coil 34b from the control device 75 for an opening and closing member, the shaft 33 is rotated around the central axis thereof by a magnetic attractive force or repulsive force generated between a magnetic force generated by the coil 34b and a magnetic force generated by the magnet 32 fixed to the yoke 31.

Then, the detector 36 can detect a rotational speed of the shaft 33 when rotation of the sensor magnet 39 integrally installed on the shaft 33 is detected by the rotation sensor 40s.

In the control device 75 for an opening and closing member, when the shaft 33 is rotated by applying electric power to the motor unit 30, rotation of the shaft 33 is transmitted to the screw shaft 60 via the reduction gear unit 50.

Accordingly, the screw shaft 60 is rotated, and a nut member 25 is moved in an axial direction of the screw shaft 60. The nut member 25 is fixed to the inner tube 24 integrated with the second housing 20, and thus, the second housing 20 telescopically moves with respect to the first housing 10 and the actuator 100 expands and contracts. When the second housing 20 is inserted with respect to the first housing 10, the tailgate 2 installed in the opening section 3 of the vehicle 1 is closed. On the other hand, when the second housing 20 is protruded from the first housing 10, the tailgate 2 installed in the opening section 3 of the vehicle 1 is opened. Even when an operation of the motor unit 30 is stopped in a state in which the actuator 100 is expanded, a state in which the second housing 20 is protruded from the first housing 10 is maintained by a biasing force of the coil spring 70.

In addition, the control device 75 for an opening and closing member includes a function of preventing sudden falling of the tailgate 2 due to, for example, a failure or the like of the actuator 100. When the tailgate 2 suddenly falls from a stopped state due to a failure or the like of the actuator 100, since the shaft 33 is rotated, the motor unit 30 generates electric power. One of features of the control device 75 for an opening and closing member according to the first embodiment is that falling of the tailgate 2 installed on the vehicle 1 can be prevented while saving electric power by activating the control device 75 from a sleep state and braking the motor unit 30 when the control device 75 is in a sleep state upon stoppage of the tailgate 2 and generation of the motor unit 30 is detected. Upon stoppage of the tailgate 2 is, for example, when the tailgate 2 is stopped in a fully open state and when application of electric power to the motor unit 30 is stopped.

Hereinafter, the control device 75 for an opening and closing member according to the first embodiment will be described in detail.

Figure 5:
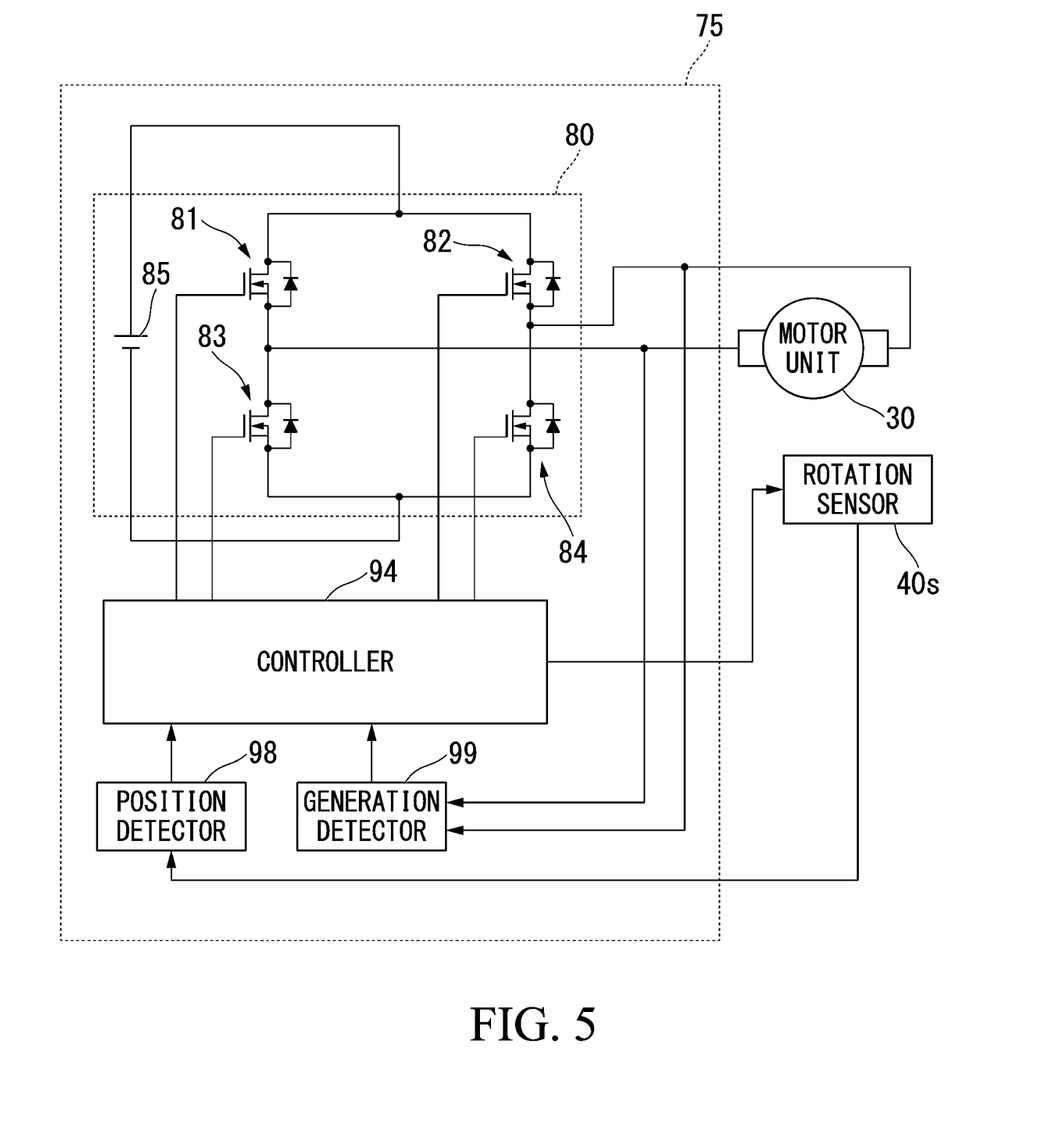
FIG. 5 is a view showing an example of a schematic configuration of the control device 75 for an opening and closing member according to the first embodiment.

FIG. 5 is a view showing an example of a schematic configuration of the control device 75 for an opening and closing member according to the first embodiment.

The control device 75 for an opening and closing member includes an inverter 80, a position detector 98, a power generation detector 99 and a controller 94.

The inverter 80 converts a direct current voltage supplied from a power supply apparatus 85 into an alternating current voltage and applies the alternating current voltage to the motor unit 30. The inverter 80 includes four switching elements 81 to 84. The inverter 80 switches between ON and OFF of each of the switching elements 81 to 84 and converts a direct current voltage into an alternating current voltage on the basis of the first driving signal and the second driving signal supplied from the controller 94.

The inverter 80 includes upper switching elements 81 and 82 and lower switching elements 83 and 84. In the first embodiment, the inverter 80 is configured such that the upper switching elements 81 and 82 and the switching elements 83 and 84 of the lower stage are connected to each other in an H bridge. Specifically, the switching elements 81 and 83 connected in series and the switching elements 82 and 84 connected in series are connected in parallel between a high potential side and a ground potential of the power supply apparatus 85. In addition, one end of a power source terminal of the motor unit 30 is connected to a connecting point between the switching element 81 and the switching element 83. The other end of the power source terminal of the motor unit 30 is connected to a connecting point between the switching element 83 and the switching element 84. For example, each of the switching elements 81 to 84 is a field effective transistor (FET) or an insulated gate bipolar transistor (IGBT). Further, as shown in FIG. 5, a configuration in which the switching elements 81 to 84 are connected to a circulation diode in parallel may be provided.

The position detector 98 counts the number of pulses of a detection signal supplied from the rotation sensor 40s when an opening and closing operation of the tailgate 2 is started (or a pulse signal appears). That is, the position detector 98 increments a count value N whenever a detection signal is acquired while using a timing in which the tailgate 2 comes to a predetermined position (for example, a fully open position) as a reference. Accordingly, the control device 75 for an opening and closing member can detect a position of the tailgate 2 on the basis of the count number N.

The power generation detector 99 detects generation of the motor unit 30. For example, the power generation detector 99 detects electromotive forces generated at both ends of the coil 34b when electric power is not applied to the motor unit 30 from the control device 75 for an opening and closing member. A case in which electric power is not applied to the motor unit 30 from the control device 75 for an opening and closing member is, for example, a case in which the tailgate 2 is stopped in a fully opened state by the biasing force of the coil spring 70 in a state in which the actuator 100 is extended. The power generation detector 99 is connected to a connecting point (one end of the power source terminal of the motor unit 30) between the switching element 81 and the switching element 83 and a connecting point (the other end of the power source terminal of the motor unit 30) between the switching element 82 and the switching element 84. The power generation detector 99 outputs a generation detection signal, which shows that power generation is detected, to the controller 94 as an interrupt signal when the power generation of the motor unit 30 is detected.

The controller 94 has a function of causing transition to a sleep state, which is a power saving state, and the controller 94 becomes sleep state (transitions to a sleep state) when the tailgate 2 is stopped. The controller 94 stops supply of electric power to the rotation sensor 40s when changed to the sleep state. Then, the controller 94 performs braking control of the motor unit 30 while supplying electric power to the rotation sensor 40s after activating from the sleep state when an interrupt signal from the power generation detector 99 is input. Further, the braking control includes stoppage control of stopping falling of the tailgate 2 by stopping the motor unit 30, speed reduction control of applying a braking force to the motor unit 30 and reducing a falling speed of the tailgate 2, and/or automated control of causing the tailgate 2 to be in a fully closed state, i.e., closing the tailgate 2 by driving the motor unit 30 in a preset driving method.

Hereinafter, the controller according to the first embodiment will be described in detail.

The controller 94 controls the inverter 80 through PWM control by outputting a first driving signal, which is for operating the opening or closing of the tailgate 2, to the inverter 80 on the basis of an opening and closing operation signal from the outside. That is, the controller 94 rotates the motor unit 30 normally and opens the tailgate 2 by controlling the inverter 80 through PWM such that the switching element 81 and the switching element 84 are turned ON when the motor unit 30 is normally rotated. In addition, the controller 94 reversely rotates the motor unit 30 and closes the tailgate 2 by controlling the inverter 80 through PWM such that the switching element 82 and the switching element 83 are turned ON when the motor unit 30 is reversely rotated. The controller 94 stops driving of the motor unit 30 by the controller 94 when the tailgate is fully opened by normally rotating the motor unit 30. Then, the controller 94 is changed to the sleep state.

The controller 94 is activated from a sleep state and controls braking of the motor unit 30 by outputting a second driving signal to the inverter 80 when an interrupt signal from the power generation detector 99 is input in the case of the sleep state. For example, the controller 94 forms a closed loop using the switching element 83, the switching element 84 and the motor unit 30 by turning ON the switching element 83 and the switching element 84. Accordingly, the controller 94 brakes the motor unit 30. Accordingly, falling of the tailgate 2 can be prevented.

In addition, the controller 94 supplies electric power to the rotation sensor 40s and determines a current position of the tailgate 2 on the basis of the count number N of the position detector 98 when activated from the sleep state. Hereinafter, determination of the current position of the tailgate 2 in the controller 94 is referred to as current position determination. However, the controller 94 does not perform current position determination of the tailgate 2 when the tailgate 2 is in a stopped state. That is, the controller 94 stops supply of electric power to the rotation sensor 40s and does not perform current position determination of the tailgate 2 when the controller 94 is in the sleep state. Then, the controller 94 restarts current position determination of the tailgate 2 while being activated from the sleep state and outputting a second driving signal to the inverter 80 when an interrupt signal from the power generation detector 99 is input. Accordingly, the controller 94 saves electric power while stopping supply of electric power to the rotation sensor 40s by changing the controller 94 to a sleep state when the tailgate 2 is stopped without performing unnecessary current position determination of the tailgate 2. Then, the controller 94 can be activated from the sleep state and reliably ascertain the current position of the tailgate 2 when sudden falling of the tailgate 2 occurs.

Hereinafter, processing of the controller 94 according to the first embodiment will be described with reference to FIG. 6.

Figure 6:
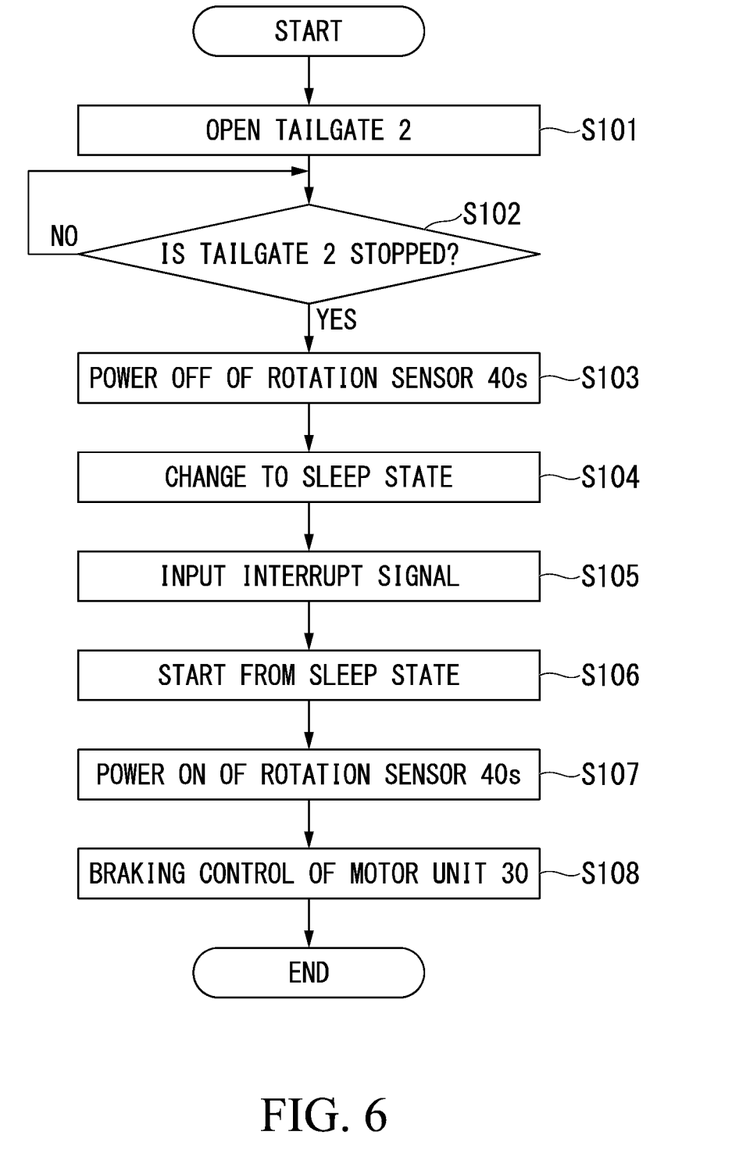
FIG. 6 is a view showing a flow of processing of a controller 94 according to the first embodiment.

FIG. 6 is a view showing a flow of processing of the controller 94 according to the first embodiment.

The controller 94 opens the tailgate 2 by outputting the first driving signal to the inverter 80 on the basis of the opening and closing operation signal from the outside (step S101). The controller 94 determines whether the current position of the tailgate 2 is a totally open position on the basis of the count number N of the position detector 98 (step S102).

The controller 94 stops driving of the motor unit 30 and stops supply of electric power to the rotation sensor 40s when it is determined that the tailgate 2 is stopped (step S103). Then, the controller 94 is changed to the sleep state (step S104).

The controller 94 is activated from the sleep state (step S106) when an interrupt signal from the power generation detector 99 is input (step S105). Then, the controller 94 supplies electric power to the rotation sensor 40s (step S107), and performs braking control of the motor unit 30 (step S108).

As described above, the control device 75 for an opening and closing member according to the first embodiment is a device configured to drive the motor unit 30 that is a driving source of the tailgate 2 which opens and closes the opening section 3 of the vehicle 1, and includes the power generation detector 99 configured to detect power generation of the motor unit 30, and the controller 94 that is in a sleep state upon stoppage of the tailgate 2, and that is activated from the sleep state and controls braking of the motor unit 30 when power generation of the electric motor is detected. Accordingly, the control device 75 for an opening and closing member can prevent falling of the tailgate 2 installed at the vehicle while saving electric power.

In addition, in the above-mentioned embodiment, the control device 75 for an opening and closing member may determine whether braking control with respect to the motor unit 30 is performed on the basis of a power generation amount generated by the motor unit 30 when the control device 75 is activated from the sleep state by an interrupt signal from the power generation detector 99. For example, the controller 94 performs braking control of the motor unit 30 upon activating from the sleep state when the power generation amount generated by the motor unit 30 is a first threshold value or more. The power generation amount is, for example, electromotive forces generated at both ends of the coil 34b. In addition, the controller 94 is changed to the sleep state again without performing braking control of the motor unit 30 when the power generation amount generated by the motor unit 30 is less than the first threshold value. Further, the power generation amount is, for example, voltages generated at both ends of the coil 34b. Accordingly, it is possible to prevent the controller 94 from activating from the sleep state due to power generation generated by an influence of noises. In addition, the controller 94 may output a generation detection signal to the controller 94 as an interrupt signal when the power generation amount generated by the motor unit 30 is less than a second threshold value. This is because polarities of the voltages generated at both ends of the coil 34b are different when the tailgate 2 suddenly falls and is suddenly raised. Accordingly, the controller 94 can detect power generation of the motor unit 30 as the tailgate 2 is suddenly raised.

In addition, in the above-mentioned embodiment, the control device 75 for an opening and closing member may determine whether braking control with respect to the motor unit 30 is performed on the basis of a rotational number or a rotation speed of the motor unit 30 and a position of the tailgate 2 when the control device 75 is activated from the sleep state by the interrupt signal from the power generation detector 99. In addition, in the above-mentioned embodiment, the control device 75 for an opening and closing member may determine whether braking control with respect to the motor unit 30 is performed on the basis of the current position of the tailgate 2 when the control device 75 is activated from the sleep state by the interrupt signal from the power generation detector 99.

Second Embodiment

Hereinafter, a control device 75A for an opening and closing member according to a second embodiment will be described. The control device 75A for an opening and closing member according to the second embodiment, after changed to the sleep state, repeats a determination state which is continued for a preset awake time (T1) and a sleep state which is continued for a preset sleep time (T2).

Figure 7:
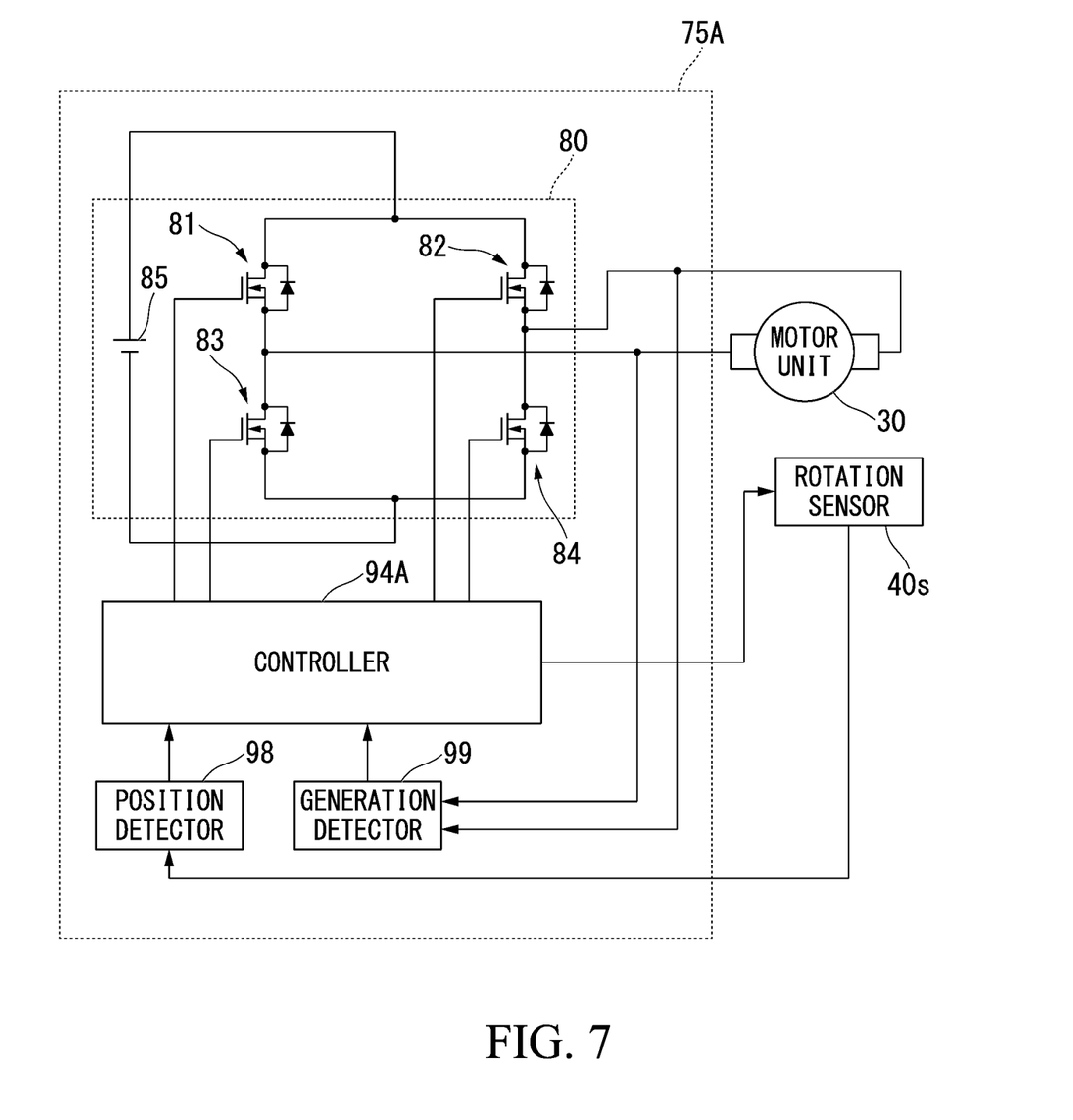
FIG. 7 is a view showing an example of a schematic configuration of a control device 75A for an opening and closing member according to a second embodiment.

FIG. 7 is a view showing an example of a schematic configuration of the control device 75A for an opening and closing member according to the second embodiment. The control device 75A for an opening and closing member includes an inverter 80, a position detector 98, a power generation detector 99 and a controller 94A.

The controller 94A includes a changing function to a sleep state that is an electric power saving state, and becomes a sleep state upon stoppage of the tailgate 2 (changed to sleep state). The controller 94A stops supply of electric power to the rotation sensor 40s when changed to the sleep state. Then, after changed to a sleep state, the controller 94A is changed to a determination state by activating the position detector 98 at prescribed intervals, and determines whether the tailgate 2 is moved on the basis of the position of the tailgate 2 in the determination state. Hereinafter, determination processing of determining whether the tailgate 2 is moved may be referred to as movement determination processing. Then, the controller 94A controls braking of the motor unit 30 when it is determined that the tailgate 2 is moved.

Figure 8:
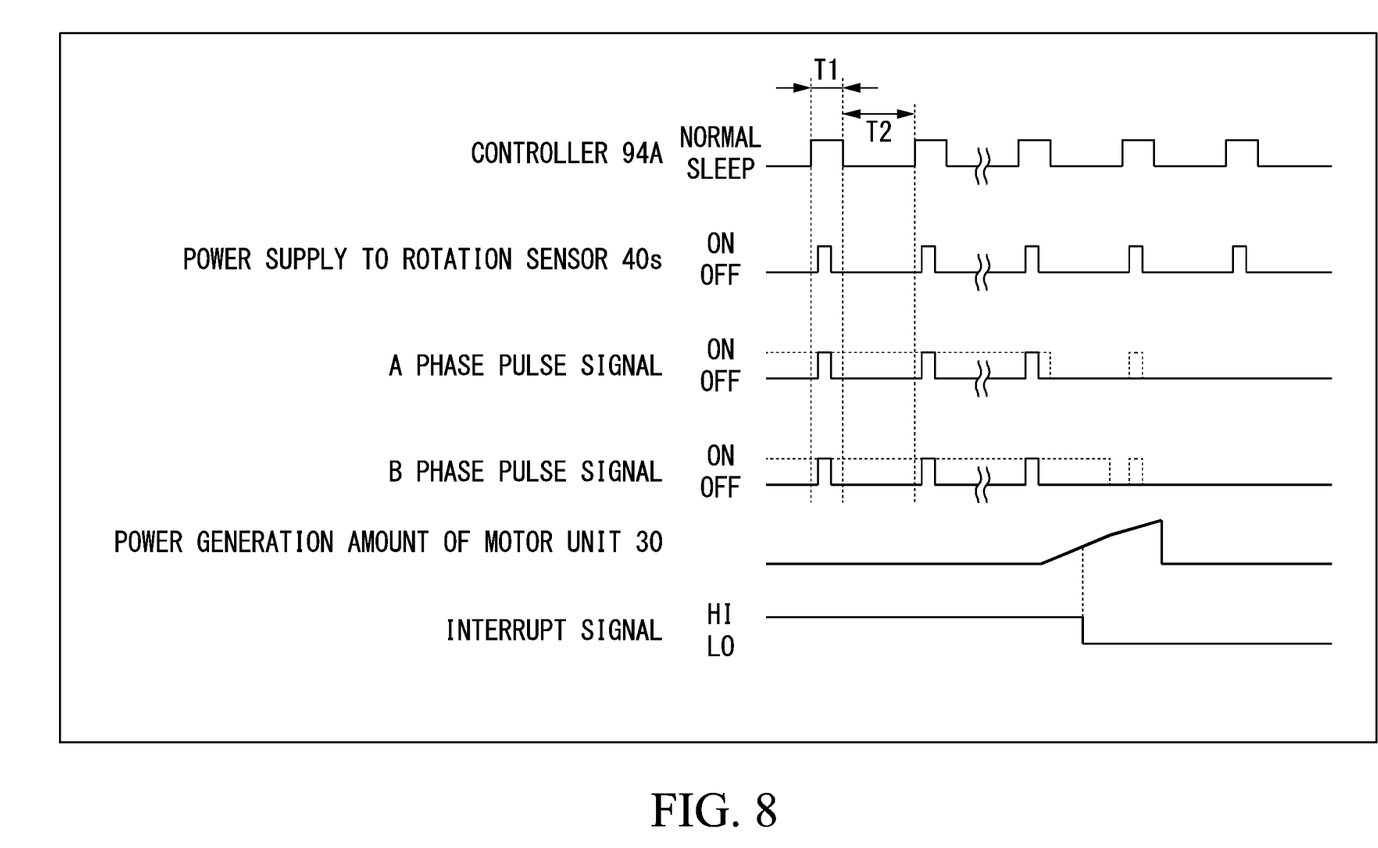
FIG. 8 is a timing chart of movement determination processing according to the second embodiment.

FIG. 8 is a timing chart of movement determination processing according to the second embodiment.

As shown in FIG. 8, after changed to a sleep state, the controller 94A repeats a determination state which is continued for an awake time (T1) and a sleep state which is continued for a preset sleep time (T2). Then, in this determination state, the controller 94A supplies electric power to the rotation sensor 40s and performs movement determination processing on the basis of an A phase pulse signal and a B phase pulse signal (a detection signal). Further, in the sleep state, the controller 94A performs braking control of the motor unit 30 while being activated from the sleep state and supplying electric power to the rotation sensor 40s when an interrupt signal from the power generation detector 99 is input. Accordingly, when the motor unit 30 is rotated at a cycle faster than the cycle of prescribed interval activation, since braking control can be performed on the basis of power generation of the motor unit 30, it is possible to prevent the detection signal from being missed in the prescribed interval activation. That is, because movement determination processing cannot be performed when the tailgate 2 falls in the sleep state, the controller 94A can reliably prevent sudden falling of the tailgate 2 while saving electric power by activating the controller 94A from a sleep state and performing braking control on the basis of power generation of the motor unit 30.

Figure 9:
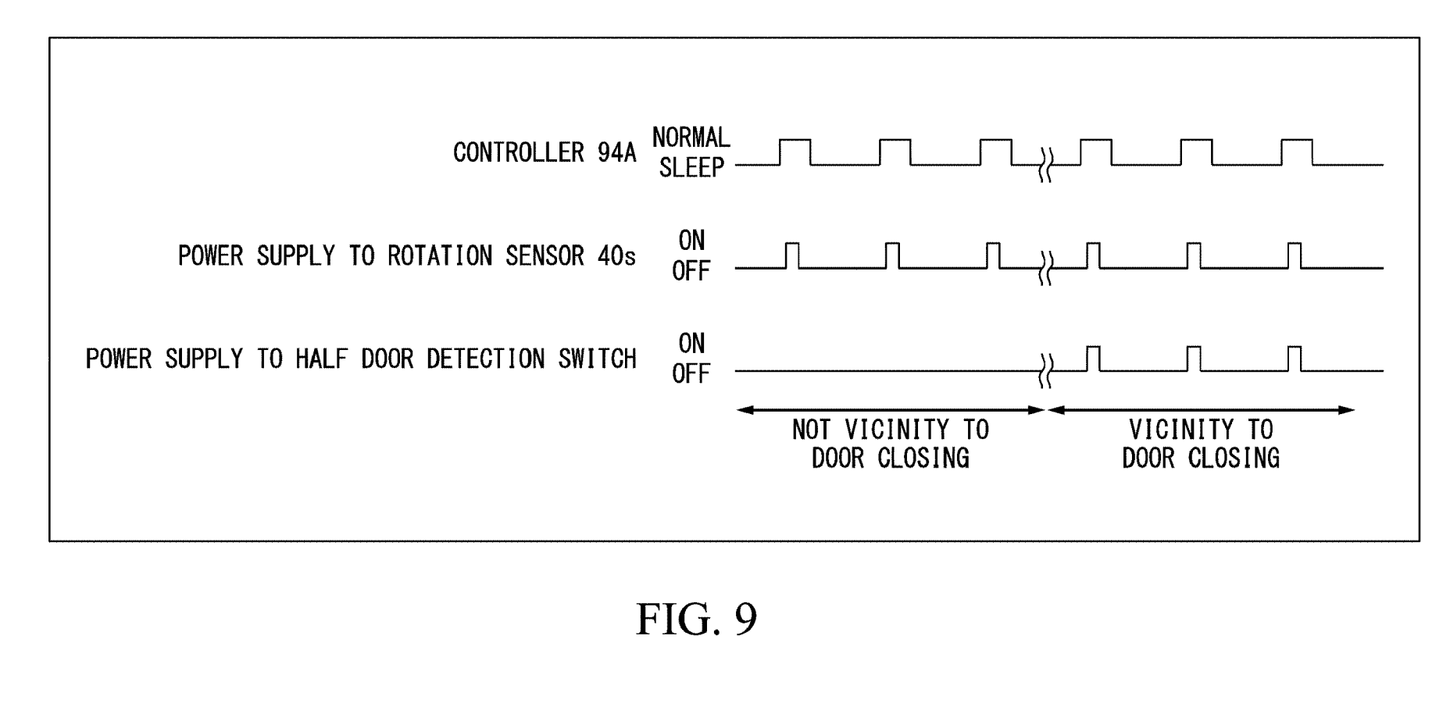
FIG. 9 is a view for explaining a method of supplying power to a half-open door detection switch with respect to an opening section 3 of the controller 94 or 94A according to the first or second embodiment.

In addition, in the above-mentioned embodiment, the controller 94 or 94A may supply electric power to a half-open door detection switch configured to detect a half-open door state of the tailgate 2 with respect to the opening section 3 when the current position of the tailgate 2 reaches a vicinity of a position in which the tailgate 2 is in a fully closed state. That is, as shown in FIG. 9, in a case the tailgate 2 is manually operated by a user to be closed, the controller 94 or 94A stops supply of electric power to the half-open door detection switch when the current position of the tailgate 2 does not reach the vicinity of the position in which the tailgate 2 is in the fully closed state. Then, in a case the tailgate 2 is manually operated by a user to be closed, the controller 94 or 94A supplies electric power to the half-open door detection switch when the current position of the tailgate 2 reaches the vicinity of the position in which the tailgate 2 is in the fully closed state. In addition, the controller 94 or 94A performs an operation of closing the tailgate 2 to the fully closed state when a half-open door state of the tailgate 2 with respect to the opening section 3 is detected by the half-open door detection switch. Further, when electric power is supplied to the half-open door detection switch, the controller 94 or 94A may always supply electric power or may supply electric power to half-open door detection switch at prescribed intervals. A consumption current in the half-open door detection switch is reduced by stopping supply of electric power except a timing required for monitoring of a half-open door state of the tailgate 2 by the half-open door detection switch.

The controller 94 or 94A according to the above-mentioned embodiment may be realized by a computer. In this case, a program configured to realize a function in the above-mentioned embodiment is recorded on a computer-readable recording medium, and the program recorded on the recording medium may be realized by being read and executed by a computer system. Further, "the computer system" disclosed herein includes OS or hardware such as peripheral devices or the like. In addition, "the computer-readable recording medium" is referred to as a portable storage medium such as a flexible disk, a magneto-optic disk, a ROM, a CD-ROM, or the like, and a storage device such as a hard disk or the like installed in the computer system. Further, "the computer-readable recording medium" may include a medium that dynamically holds a program for a short time such as a communication wire when the program is transmitted via a network such as the Internet or the like or a communication line such as a telephone line or the like, and a medium that holds a program for a certain time such as a volatile memory in a computer system that is a server or a client in this case. In addition, the program may realize a part of the above-mentioned function, and further, the above-mentioned function may be realized through combination with the program already recorded in the computer system and may be realized using a programmable logic device such as a field programmable gate array (FPGA).

Hereinabove, while the embodiments of the present invention have been described in detail with reference to the accompanying drawings, the specific configurations are not limited to the embodiments and also include designs or the like without departing from the scope of the present invention.

REFERENCE SIGNS LIST

30 Motor unit
75 Control device for an opening and closing member
80 Inverter
94 Controller
98 Position detector
99 Power generation detector

The invention claimed is:

1. A control device for an opening and closing member that drives a driving source of an opening and closing member that opens and closes an opening section of a vehicle, the control device for the opening and closing member comprising:
   a rotation sensor that outputs a pulse signal to detect a position of the opening and closing member;
   a power generation detector that detects power generation of the driving source; and
   a controller that controls driving of the driving source,
   wherein the controller is changed to a sleep state upon stoppage of the opening and closing member, during in the sleep state, the controller controls a braking of the driving source when the opening and closing member is moving on a basis of an activation of the rotation sensor at a prescribed interval, and also controls the braking of the driving source when the power generation detector detects power generation of the driving source in the sleep state in which the activation of the rotation sensor at the prescribed interval is not performed.

2. The control device for an opening and closing member according to claim 1, wherein, when a position of the opening and closing member reaches a vicinity of a position in which the opening and closing member is in a fully closed state, the controller supplies electric power to a half-open door detection switch that detects a half-open door state of the opening and closing member with respect to the opening section.

* * * * *